United States Patent
Watts et al.

(10) Patent No.: US 11,210,194 B2
(45) Date of Patent: *Dec. 28, 2021

(54) DISTRIBUTED WEBSITE LOAD TESTING SYSTEM RUNNING ON MOBILE DEVICES

(71) Applicant: Neocortix, Inc., Santa Clara, CA (US)

(72) Inventors: Donald Lloyd Watts, Mountain View, CA (US); Dmitry Moskalchuk, Netanya (IL)

(73) Assignee: Neocortix, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,029

(22) Filed: Jun. 16, 2020

(65) Prior Publication Data

US 2020/0379865 A1 Dec. 3, 2020

Related U.S. Application Data

(63) Continuation of application No. 15/703,313, filed on Sep. 13, 2017, now Pat. No. 10,733,073.

(60) Provisional application No. 62/402,185, filed on Sep. 30, 2016.

(51) Int. Cl.
    *G06F 11/34* (2006.01)
    *G06F 11/32* (2006.01)
    *H04W 88/02* (2009.01)

(52) U.S. Cl.
    CPC ........ *G06F 11/3414* (2013.01); *G06F 11/328* (2013.01); *H04W 88/02* (2013.01)

(58) Field of Classification Search
    CPC ... G06F 11/3414; G06F 11/328; H04W 88/20
    See application file for complete search history.

(56) References Cited

U.S. PATENT DOCUMENTS

| | | | |
|---|---|---|---|
| 7,788,655 B2 | 8/2010 | Plummer | |
| 8,561,038 B1 | 10/2013 | Sams | |
| 8,732,261 B2 | 5/2014 | Fok | |
| 9,372,680 B2 | 6/2016 | Adams | |
| 10,733,073 B1* | 8/2020 | Watts | G06F 11/328 |
| 2002/0128001 A1 | 9/2002 | Shuttleworth | |
| 2003/0074606 A1* | 4/2003 | Boker | G06F 11/3414 |
| | | | 714/42 |
| 2006/0048105 A1 | 3/2006 | Plummer | |
| 2008/0133687 A1 | 6/2008 | Fok | |

(Continued)

OTHER PUBLICATIONS

Author Unknown, Android Studio with Experimental Gradle Plug-In and CrystaX NDK, CrystaX, Dec. 14, 2015, https://www.crystax.net/en/blog/7#cut.

(Continued)

*Primary Examiner* — Manuel L Barbee
(74) *Attorney, Agent, or Firm* — Van Pelt, Yi & James LLP

(57) ABSTRACT

An instruction to perform load testing is sent to a mobile device where an application running on the mobile device determines whether the mobile device is in a state where load testing is permitted. In response to receiving the instruction, the application running on the mobile device performs load testing on a web server if the mobile device is in the state where load testing is permitted. Performance information associated with the load testing is received from the application running on the mobile device and the performance information associated with the load testing is displayed.

20 Claims, 16 Drawing Sheets

(56) References Cited

U.S. PATENT DOCUMENTS

| | | | |
|---|---|---|---|
| 2009/0222508 A1* | 9/2009 | Hubbard | G06Q 30/02 709/202 |
| 2013/0061093 A1 | 3/2013 | Choi | |
| 2014/0189679 A1 | 7/2014 | Adams | |

OTHER PUBLICATIONS

Author Unknown, Boost + Android? CrystaX NDK!, CrystaX, Jan. 20, 2015, https://www.crystax.net/en/blog/2#cut.
Author Unknown, CrystaX NDK 10.2.0 Released!, CrystaX, Jun. 24, 2015, https://www.crystax.net/en/blog/5#cut.
Author Unknown, CrystaX NDK 10.3.0 Released!, CrystaX, Dec. 14, 2015, https://www.crystax.net/en/blog/6#cut.
Author Unknown, Fund Raising Campaign Started, CrystaX, Mar. 24, 2015, https://www.crystax.net/en/blog/4#cut.
Author Unknown, GCC 6—Now for Android, CrystaX, Feb. 26, 2016, https://www.crystax.net/en/blog/8#cut.
Author Unknown, Native Localization in Android? Yes, with CrystaX NDK!, CrystaX, Jan. 20, 2015, https://www.crystax.net/en/blog/1#cut.
Author Unknown, Using Android Studio to Build Applications with NDK and Boost C++ Libraries, CrystaX, Jan. 29, 2015, https://www.crystax.net/en/blog/3#cut.
Cox et al., "Iridis-pi: a low-cost, compact demonstration cluster", Cluster Computing, vol. 17 Issue 2 [online], 2014 [retrieved Feb. 18, 2019], Retrieved from Internet: <URL: https://link.springer.com/article/10.1007/s10586-013-0282-7>, pp. 349-358.
Frenkel, Updates to Unity, C++, and iOS Tools for Play Game Services, Android Developers Blog, Jun. 12, 2015, https://android-developers.googleblog.com/2015/06/updates-to-unity-c-and-ios-tools-for.html.
Miles, Utilities for C/C++Android Developers: fplutil 1.0, Android Developers Blog, Nov. 10, 2014, https://android-developers.googleblog.com/2014/11/utilities-for-cc-android-developers.html.
Mulimani, M., "Redirection-JNI", Githum [online], 2014 [retrieved Aug. 6, 2018], Retrieved from Internet: <URL: https://github.com/manishcm/Redirection-JNI>, p. 1.
Onur Cinar, Pro Android C++ with the NDK [online], New York, apress, 2012 [retrieved May 22, 2020], Retrieved from Internet: <URL: https://link.springer.com/book/10.1007/978-1-4302-4828-6>. pp. 155-177.
Paul Lutus, Linux on Android, aracnhoid.com [online], 2015 [retrieved May 21, 2020], pp. 1-7. Retrieved from Internet: <https://arachnoid.com/android/LinuxOnAndroid/index.html>, pp. 1-7.
Pereira, C.S., "A Typical Linux C Application: Standard I/O Ports Allowing Simple IPC Pipe Based", Code Project [online], 2008 [retrieved Aug. 6, 2018], Retrieved from Internet: <URL: https://www.codeproject.com/Articles/30195/A-Typical-Linux-C-Application-Standard-I-O-ports-a>, pp. 1-8.
Ratabouil, S., Android NDK Beginner's Guide [online], Second Edition, London, Packt Publishing, 2015 [retrieved Jan. 7, 2018], pp. 365-426.
Ratabouil, S., Android NDK Beginner's Guide [online], Second Edition, London, Packt Publishing, 2015 [retrieved Jan. 7, 2018], pp. i-215.

* cited by examiner

US 11,210,194 B2

1

DISTRIBUTED WEBSITE LOAD TESTING SYSTEM RUNNING ON MOBILE DEVICES

CROSS REFERENCE TO OTHER APPLICATIONS

This application is a continuation of U.S. patent application Ser. No. 15/703,313, now U.S. Pat. No. 10,733,073, entitled DISTRIBUTED WEBSITE LOAD TESTING SYSTEM RUNNING ON MOBILE DEVICES filed Sep. 13, 2017, which claims priority to U.S. Provisional Patent Application No. 62/402,185 entitled DISTRIBUTED WEBSITE LOAD TESTING SYSTEM RUNNING ON MOBILE DEVICES filed Sep. 30, 2016, both of which are incorporated herein by reference for all purposes.

BACKGROUND OF THE INVENTION

Load testing is a type of stress testing where a server (e.g., a web server) is sent many requests, the server responds to the requests, and the response of the server is observed and evaluated. Oftentimes, load testing is performed using a cloud computing service (e.g., offered by Amazon, Google, etc.). New types of load testing which improve the quality of the test would be desirable.

BRIEF DESCRIPTION OF THE DRAWINGS

Various embodiments of the invention are disclosed in the following detailed description and the accompanying drawings.

FIG. 14 is a flowchart illustrating an embodiment of a process to use account information to select a subset of mobile devices to perform bottleneck checking on.

FIG. 15 is a flowchart illustrating an embodiment of a process to use registration times to select a subset of mobile devices to perform bottleneck checking on.

FIG. 16 is a flowchart illustrating an embodiment of a process to use wireless network information to select a subset of mobile devices to perform bottleneck checking on.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a load testing technique which uses mobile devices are described herein. In some embodiments, an instruction to perform load testing is sent to a mobile device, wherein: an application running on the mobile device determines whether the mobile device is in a state where load testing is permitted; and in response to receiving the instruction, the application running on the mobile device performs load testing on a web server if the mobile device is in the state where load testing is permitted; performance information associated with the load testing is received from the application running on the mobile device; the performance information associated with the load testing is displayed.

Figure 1:
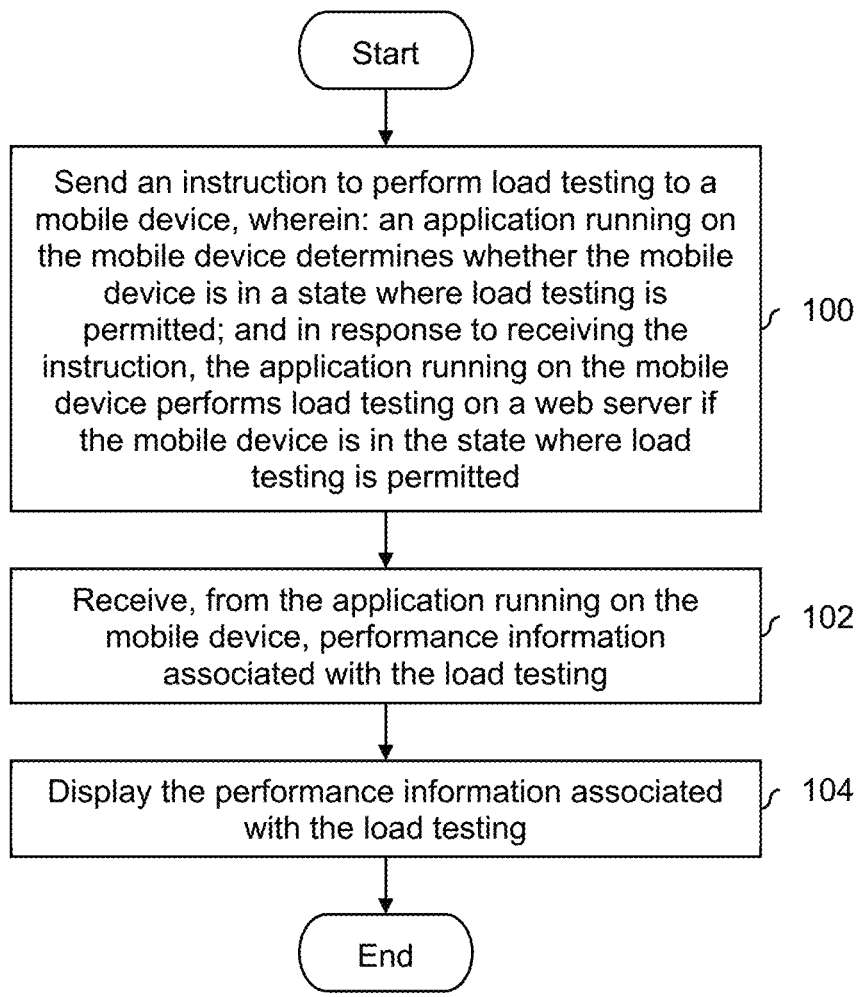
FIG. 1 is a flowchart illustrating an embodiment of a process to perform load testing using a mobile device.

FIG. 1 is a flowchart illustrating an embodiment of a process to perform load testing using a mobile device. In some embodiments, the process is performed by a load testing server. For example, a company may contract with a load testing service to test the load handling capabilities of the company's web server using mobile devices. The load testing server may be a server which communicates via a network with load testing apps on various mobile devices (e.g., with good geographic distribution) in order to perform the requested load test.

At 100, an instruction to perform load testing is sent to a mobile device, wherein: an application running on the mobile device determines whether the mobile device is in a state where load testing is permitted; and in response to receiving the instruction, the application running on the mobile device performs load testing on a web server if the mobile device is in the state where load testing is permitted.

In one example, users volunteer or otherwise agree to let their mobile devices be used for load testing. In some embodiments, mobile devices which perform load testing include mobile telephones, tablets, or other devices with a (e.g., mobile) operating system and which is capable of downloading and running a load testing app. The user downloads the load testing app onto their mobile device and performs any account creation, login, registration, etc. required by the load testing service provider in order to participate in load testing. In some cases, the mobile device is their primary device. Alternatively, the mobile device may be an extra or backup device.

In one example, a mobile device is in a state where load testing is permitted in step 100 if the mobile device is connected to a charger (e.g., so that the load testing does not drain the mobile device's battery) and the mobile device is connected to a Wi-Fi network (e.g., so that load testing can be done without impacting any data limits associated with a mobile data network such as 4G or LTE). In some embodiments, the check performed at step 100 includes a third requirement for the mobile device be idle (e.g., so that the load testing does not interfere with the user interacting with the mobile device and/or with other applications on the phone which might be running). Such a check may be done in a variety of ways, such as a system call querying the CPU load, or measuring the time duration since the last user interaction with the device.

In one example, the load testing server specifies the web server to test (e.g., to load testing app) by specifying at least one URL. In some embodiments, a sequence of URLs to test are specified (e.g., to simulate a user clicking on links). Generally speaking, during load testing, the load testing app will send a page request to the URL or web server being tested, receive the requested web page back from the web server, and record performance information associated with that request and response. For example, the recorded performance information may include a timestamp when the request was sent, a timestamp when the requested page was completely received, a time difference between the two timestamps which corresponds to the load time or turn-around time, etc.

Although only one mobile device is referred to in step 100, multiple mobile devices may have been selected to perform a given load test. This may be desirable because more devices help to achieve the desired load. Also, in some embodiments, the mobile devices are geographically distributed which may be desirable because slow geographic regions or areas (e.g., where a user in that region would experience a slow(er) load time) can be exposed. Accordingly, the mobile devices which are picked to participate in a given load test may be selected to have good geographic distribution and/or representation (e.g., include mobile devices from all 50 states instead of only using mobile devices in California).

In some embodiments, a load testing customer specifies what regions or countries to select mobile devices from for load testing. For example, some load testing customers may only care about users in the United States and therefore request load testing using US-only mobile devices. Alternatively, a multinational company or entity with a global presence or audience may want to perform load testing using mobile devices from multiple countries. This information may be specified by the load testing customer and used to select mobile devices to perform the load test.

In addition to specifying which URL(s) or web server to test, the load testing server may also specify one or more other settings to instruct or configure the load test app on a mobile device as needed. Some example settings include a test duration, a time between page requests, etc. In some embodiments, a load test includes stepping up the load (e.g., the load over time looks like a step function with multiple steps) and the settings are associated with stepping up the load at different stages or levels (e.g., speed up frequency of page requests). In some embodiments, load testing is synchronized and/or the start of lead testing is set ahead of time (e.g., using a network and/or atomic clock) so that multiple mobile devices send a request at the same time and the setting is associated with a page request send time and/or a load testing start time.

In various embodiments, load testing is initiated or started in a variety of ways. In some embodiments, as soon as the instruction is received, the application running on the mobile device begins load testing (e.g., assuming the mobile device is in a state where load testing is permitted). Alternatively, the instruction may specify a start time in the future when load testing should begin (e.g., again, assuming the mobile device is in a state where load testing is permitted).

In some embodiments, a load testing app periodically checks the status or state of the mobile device (e.g., even when load testing is not being performed) and sends this state information to a load testing server. For example, this push technique may enable a load testing server to know what mobile devices are ready to perform load testing. The load testing server may use this information to select mobile devices to perform load testing which is imminent and/or to establish a historical baseline about what windows of time have peak numbers of mobile devices which are in a state to perform load testing.

In some embodiments, a web server can either return a mobile web page designed for mobile devices (e.g., which is smaller so that less bandwidth is used and/or has a different layout) or a desktop web page designed for bigger screens and/or more bandwidth. In some embodiments, to further stress the system, at least some of the mobile devices cause the web server to return desktop web pages, even though the requester is a mobile device. This may be done in a variety of ways. In some embodiments, some setting or configuration (e.g., in the browser) is set to a desktop setting or configuration instead of a mobile one. In some embodiments, the load testing app is given a desktop-specific URL to test or otherwise access which forces the web server to return a desktop web page (e.g., even if the web server detects or otherwise thinks that the requesting device is a mobile device).

At 102, performance information associated with the load testing is received from the application running on the mobile device. For example, in one figure described in more detail below, the load testing app records response times (e.g., the difference between a timestamp when a page request was sent and a timestamp when the requested web page was completely returned) over multiple requests. Once the load test has completed, the load testing app uploads the performance information from the mobile device to a load testing server. In some embodiments, this upload is only done via Wi-Fi and not a mobile data network (e.g., 4G, LTE, etc.).

Other information may also be uploaded to the load testing server as desired (e.g., the load testing app would be instructed via a parameter or setting to upload a certain set of information and/or metadata). In one example, the load testing app obtains GPS position information (e.g., from a GPS unit in the mobile device) and uploads geographic or position information associated with the mobile device along with the performance information. For example, this may help the load testing server display or present information (e.g., what country, state, or other geographic region a particular data point is from or associated with). In another example, the load testing app derives approximate position information from the IP address of the device.

At 104, the performance information associated with the load testing is displayed. For example, the various mobile devices which participated in that particular load test may be geographically distributed throughout the United States and/or the world and performance information may be grouped and presented according to geographic areas. As will be described in more detail below, there may be some graphical user interface via which an administrator associated with the web server being tested is able to select what geographic areas to display performance information for (e.g., only display performance information collected from mobile devices in a particular state) and/or the degree or scope of the geographic areas (e.g., display performance information at the country level, at the state level, at the county level, etc.).

It may be helpful to show a system with various devices which are involved in a load test. The following figure shows one such example.

Figure 2:
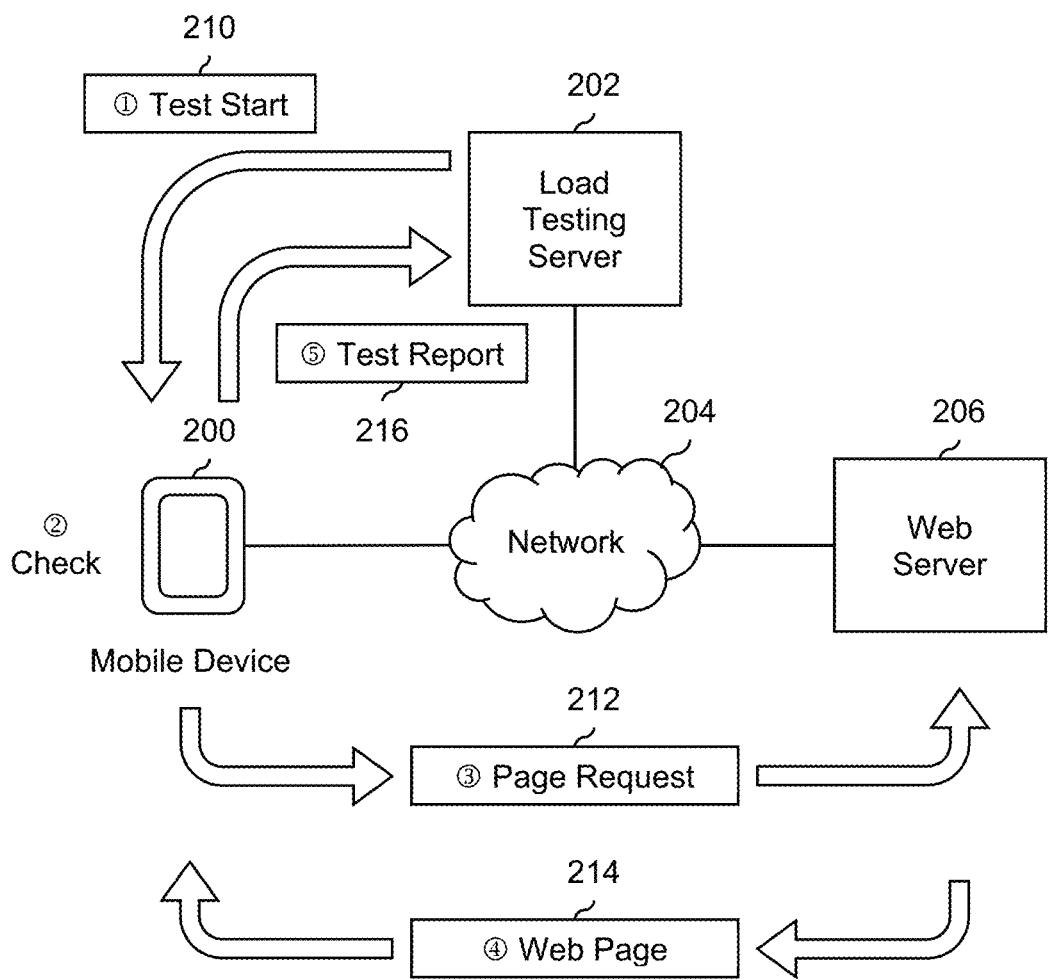
FIG. 2 is a diagram illustrating an embodiment of various devices in a system where load testing is performed using a mobile device.

FIG. 2 is a diagram illustrating an embodiment of various devices in a system where load testing is performed using a mobile device. In the example shown, the user or owner of mobile device 202 has agreed to let that device participate in load testing and a load testing app (not shown) has been downloaded to the mobile device. To preserve the readability of the figure, only a single mobile device is shown here, but there may be other mobile devices which are participating in the exemplary load test. The other mobile devices will operate in the same manner as the single mobile device shown and described here.

An instruction to start the load test (210) is sent from load testing server 202 to the load testing app on mobile device 200 via network 204. The load testing app on the mobile device then checks if the mobile device is in a state where load testing is permitted. For example, the load testing app will check to see if the mobile device is connected to a Wi-Fi network and if the mobile device is connected to a charger. In this example, both conditions need to be satisfied in order for load testing to be permissible.

If the check passes, then the load testing app begins load testing. This is done by sending page request 212 to web server 206 via network 204. For example, the test start instruction (210) from the load testing server may have included one or more URLs and the URLs are associated with and/or map to web server 206. In response to the page request (212), the web server (206) sends the requested web page (214) back to the load testing app on the mobile device 200, again via network 204. This process of exchanging page requests and web pages repeats for some predetermined amount of time (e.g., specified by the load testing server via some setting or configuration). Meanwhile, the load testing app records performance information associated with the page request (212) and/or web page (214), such as a response time between the sending of the page request and the (e.g., complete) return of the web page.

In some embodiments, a sequence of URLs associated with the web server is tested during the load test with some wait (e.g., on the order of 3 seconds) between successive page requests. For example, the sequence of URLs and wait time could simulate a user going to a home page, reading the home page, clicking on a link displayed in the home page, reading the next page, clicking on another link, and so on.

Once the load testing app has completed load testing, a test report (216) which includes the recorded performance information is sent from the load testing app on the mobile device (200) to the load testing server (202). The load testing server may collect performance information from one mobile device at one location (e.g., state X and/or country X) as well as performance information from another mobile device at another location (e.g., state Y and/or country Y). This performance information may then be presented to a system administrator associated with web server 206 so that the system administrator can better understand what geographic areas are experiencing slow(er) response or load times. For example, this may permit a system administrator to identify where to put a mirroring site so that pages can load more quickly for users in a slow or underserved geographic area.

The following figure illustrates how performing load testing using a mobile device has benefits over other load testing systems.

Figure 3:
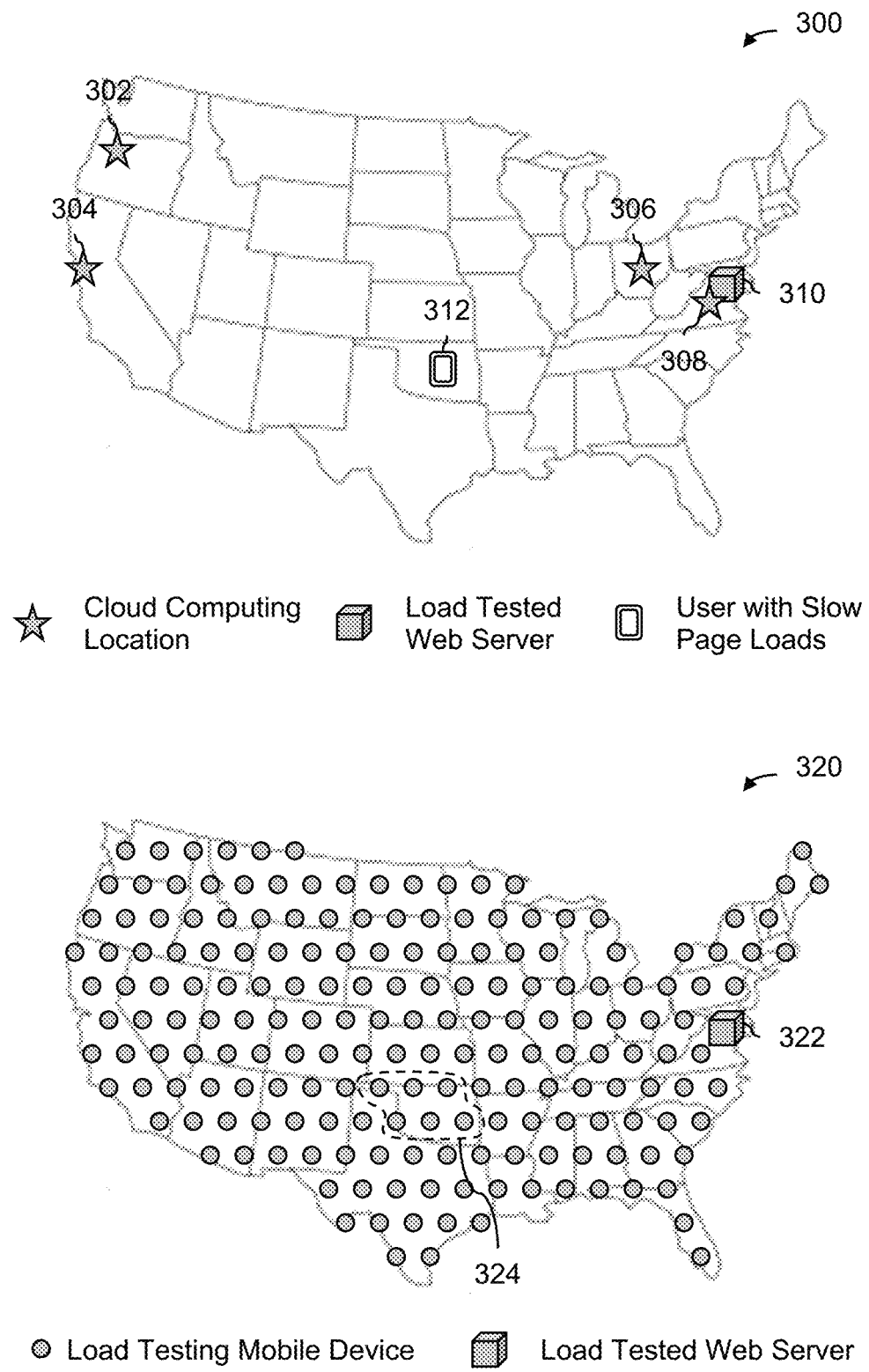
FIG. 3 is a diagram illustrating an embodiment of the geographic locations of devices associated with two load testing techniques.

FIG. 3 is a diagram illustrating an embodiment of the geographic locations of devices associated with two load testing techniques. Diagram 300 shows a map of the United States where load testing is done using a cloud computing service (e.g., Amazon Web Services). In this load testing paradigm, one or more of the cloud computing locations (302, 304, 306, and 308) send page requests to the web server being load tested (310) and record the response times to the requests. In this example, the load tested web server (310) is located very close (e.g., geographically) to one of the cloud computing locations (308). This means that the load testing performance will appear very good (i.e., have fast response times) given the close geographic proximity of web server 310 and cloud computing location 308. This disguises the slow page load time observed by user 312 who is not located near any of the cloud computing locations. In other words, the results of the load testing performed by the cloud computing service will show artificially good results for web servers that are located near a cloud computing location.

Diagram 320 shows a map of the United States where load testing is done using geographically distributed mobile devices. As shown here, mobile devices from all over the 48 contiguous states participate in the example load testing, including mobile devices (324) located in the same state as the user with the slow page loads (312). The performance information observed by and obtained from these mobile devices will reveal that users in that state experience slow page load times. This information enables a system administrator to take corrective measures, for example by employing a mirror site somewhere in the central United States. As shown here, load testing using mobile devices provides more accurate test results. Load testing using a mobile device is sometimes referred to as last mile load testing, since usage of a mobile device enables the last mile of the network to be tested, not just the network backbones or data trunks.

Another benefit to using mobile device(s) to perform load testing is that they tend to be power efficient devices. The battery life of mobile devices is an important design consideration which is thoroughly scrutinized by the buying public and technology reporters. For this reason, the electrical components (e.g., ASICs and FPGAs) which are used in mobile devices are specifically designed to consume as little power as possible even when running. In contrast, server farms and/or cloud computing devices are not necessarily built with low power consumption components and/or with such stringent power consumption design considerations in mind. This means that running a load test with mobile devices will tend to consume less power than the same load test that is done using a server farm and/or a cloud computing service.

Returning briefly to FIG. 1, some examples described above touched on how it is determined whether a mobile device is in a state where load testing is permitted (see step 100). Those examples are described more generally and/or formally in the flowchart below.

Figure 4:
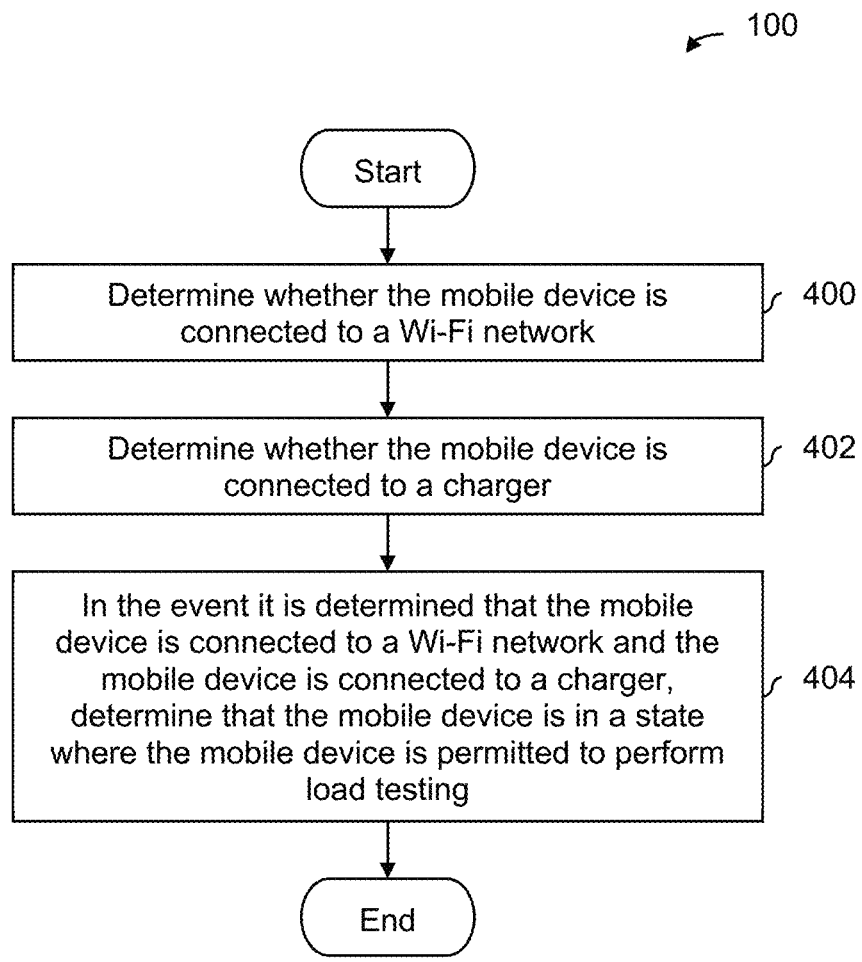
FIG. 4 is flowchart illustrating an embodiment of a process to determine whether a mobile device is in a state where load testing is permitted.

FIG. 4 is flowchart illustrating an embodiment of a process to determine whether a mobile device is in a state where load testing is permitted. In some embodiments, an application running on a mobile device performs the process of FIG. 4 when checking if that mobile device is permitted to perform load testing (see step 100 in FIG. 1).

At 400, it is determined whether the mobile device is connected to a Wi-Fi network. For example, most mobile devices these days run some type of mobile operating system (e.g., Android, iOS, etc.). These mobile operating systems often provide utilities and/or tools in order for downloaded apps to obtain state information about the mobile device, including whether the mobile device is connected to a Wi-Fi network. Depending upon the mobile operating system, the appropriate utility or call is used.

At 402, it is determined whether the mobile device is connected to a charger. Again, the appropriate utility or tool (e.g., mobile operating system dependent) is employed to obtain this state information about the mobile device.

At 404, in the event it is determined that the mobile device is connected to a Wi-Fi network and the mobile device is connected to a charger, it is determined that the mobile device is in a state where the mobile device is permitted to perform load testing. For example, in FIG. 1, this would permit a load testing app on the mobile device to perform load testing on the web server being tested at step 100.

In some embodiments, some other combination of checks is performed. For example, in addition to the two checks recited above, there may be one or more additional check(s) to ensure that the mobile device is idle.

It may be helpful to show a graphical representation of a load test and the resulting display of performance information from that load test. The following figure shows one example.

Figure 5:
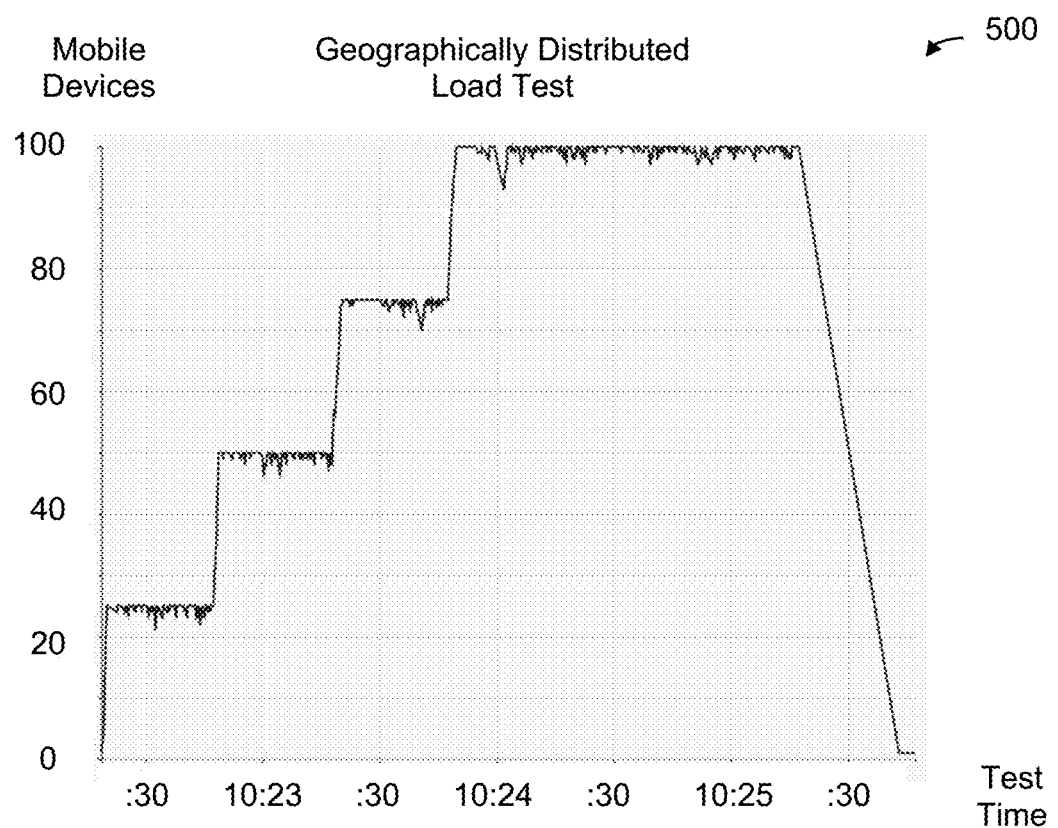
FIG. 5 is a diagram illustrating an embodiment of a load test and corresponding performance information which is displayed.
Figure 5:
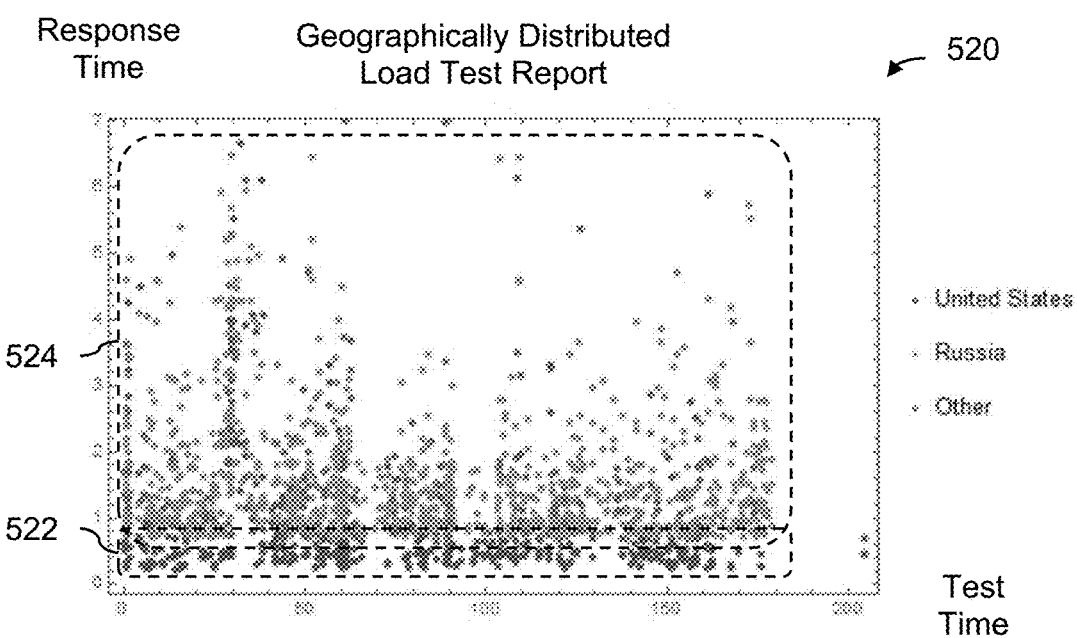

FIG. 5 is a diagram illustrating an embodiment of a load test and corresponding performance information which is displayed. For example, in the context of FIG. 1, the geographically distributed load test shown in diagram 500 may be used during the load testing referred to in step 100 and the geographically distributed load test report shown in diagram 520 may be displayed at step 104.

Diagram 500 shows an example of geographically distributed load test. This load test is referred to as being geographically distributed because the mobile devices which perform the load test are located in a variety of locations including the United States, Russia, and other countries. The x-axis in this diagram corresponds to the test time (e.g., in local time, which is why the test does not begin at time t=0) and the y-axis corresponds to the load, which in this example is the number of mobile devices which are participating in the load test at any given time).

As shown in diagram 500, the load test is a multi-level step function. During a first period of time, 25 mobile devices send page requests for a duration of ~30 second. Then, 50 mobile device send page requests for another ~30 seconds and then 75 mobile devices send pages for another ~30 seconds. At the last test level, 100 mobile devices sends page requests for a longer duration of ~1 minute and 30 seconds.

Diagram 520 shows the corresponding test report which results from the load test shown in diagram 500. In this diagram, the x-axis is the time from the start of the load test (so time begins at t=0) and the y-axis shows the response time (e.g., the time observed by a given mobile device measured from when the page request is sent out until the requested page is returned, which is representative of how much time it would take a web browser on that mobile device to load that page). In this example, mobile devices located in the United States, Russia, and other countries participate in the load test. The mobile device located in the United States tend to have good response times which fall in region 522. The mobile devices located in Russia and other countries tended to observe slower response and their response times tend to fall in region 524.

Using a multi-level step function as shown in diagram 500 may be desirable because it more clearly indicates if the web server is being overwhelmed by the load testing. That is not the scenario shown here. If the web server were overwhelmed by the load testing, the response times would tend to drift higher as the test time progressed. That is not the case here since the response times observed at the beginning of the load test are substantially the same as those observed at the end of the load test. In some embodiments, one or more mean or average response times associated with a group of mobile devices is/are displayed in order to more clearly indicate any upward drift in response times (e.g., which in turn would indicate that the web server is overwhelmed). For example, in diagram 520, a mean response time (e.g., which varies as a function of test time) may be plotted for mobile devices from the United States, for mobile devices from Russia, and for mobile devices from other countries.

Although not shown here, display 520 may be associated with a graphical user interface which permits the user to select what performance information is displayed and/or how that information is grouped or otherwise presented. For example, the user (if desired) may de-select the Russia and other country performance information so that only performance information from US mobile device is displayed. If desired, the user can then "drill down" into that data so that performance information is grouped and displayed at the regional level (e.g., West, Midwest, South, etc.) or the state level.

In order to display the performance information as shown in diagram 520 (e.g., where the country of each participating mobile device is shown), the location of each mobile device and/or for each set of performance information received at the load testing server is obtained. The following figure shows an example of how this may be accomplished.

Figure 6:
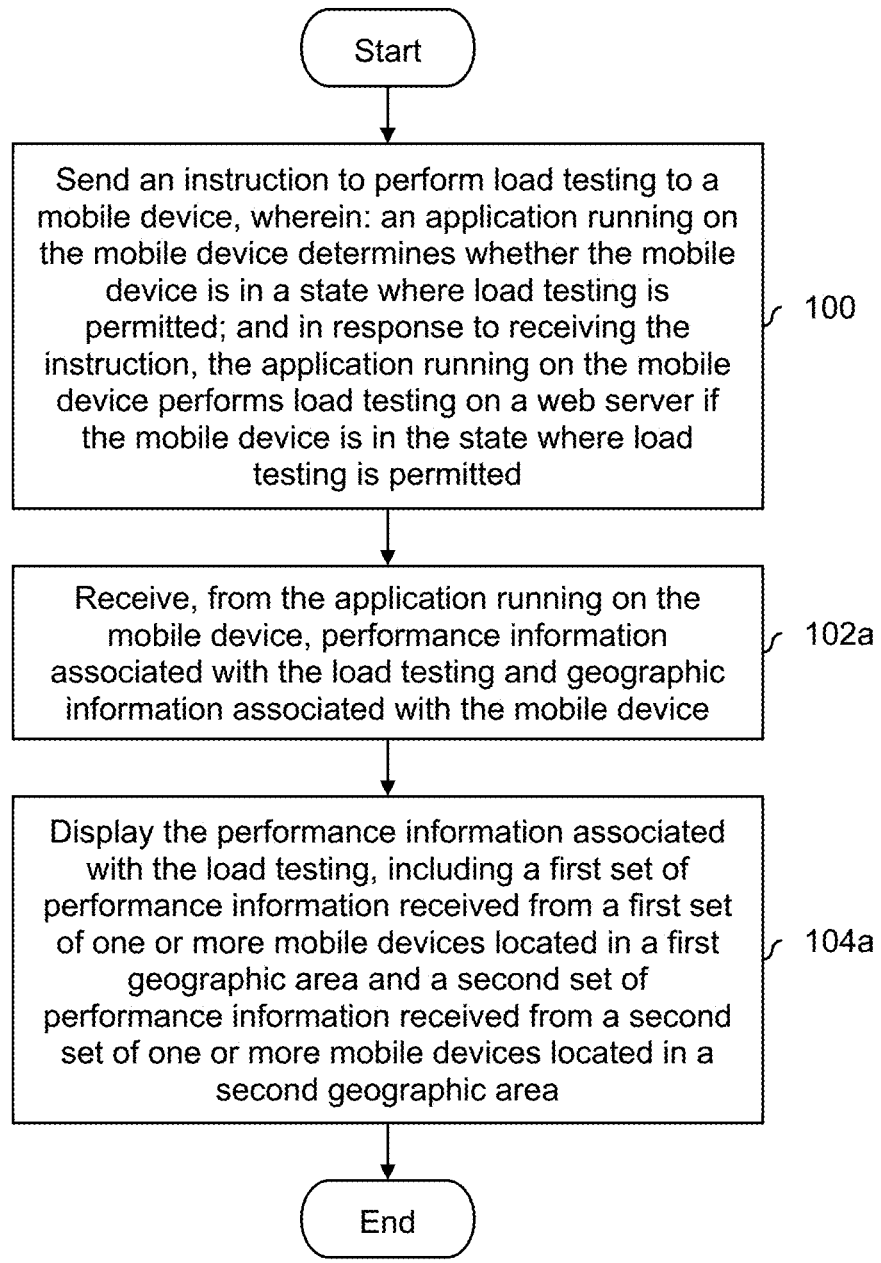
FIG. 6 is a flowchart illustrating an embodiment of a process to perform load testing using a mobile device where geographic information associated with the mobile device is uploaded to a load testing server.

FIG. 6 is a flowchart illustrating an embodiment of a process to perform load testing using a mobile device where geographic information associated with the mobile device is uploaded to a load testing server. FIG. 6 is related to FIG. 1 and for convenience similar reference numbers are used to show related steps.

At 100, an instruction to perform load testing is sent to a mobile device, wherein: an application running on the mobile device determines whether the mobile device is in a state where load testing is permitted; and in response to receiving the instruction, the application running on the mobile device performs load testing on a web server if the mobile device is in the state where load testing is permitted.

At 102a, performance information associated with the load testing and geographic information associated with the mobile device are received from the application running on the mobile device. For example, a load testing app running on the mobile device may obtain geographic information from a GPS unit in the mobile device each time a new load test is performed. This may be desirable because it contains up to date information that is accurate even if the mobile device is moved from one place to another.

In some embodiments, only devices with GPS capabilities and where the user has permitted the load testing app to access location information from the GPS are permitted to participate in load testing. For example, with the former, geographic information cannot be obtained because there is no GPS unit. With the latter, there may be a GPS unit, but access to location information from the GPS unit is not granted or otherwise permitted. In some embodiments, these checks are performed during registration or sign up of the mobile device and mobile devices without GPS capabilities or where access to GPS information is not permitted are not allowed to register. Or the approximate device location can be derived from the IP address of the device.

At 104a, the performance information associated with the load testing is displayed, including a first set of performance information received from a first set of one or more mobile devices located in a first geographic area and a second set of performance information received from a second set of one or more mobile devices located in a second geographic area. For example, in diagram 520 in FIG. 5, the display separates out response times observed by mobile devices located in the United States (e.g., data points are displayed using a first color), Russia (e.g., data points are displayed using a second color), and other countries (e.g., data points are displayed using a third color), respectively.

A variety of techniques may be used to select a geographically distributed group of mobile devices to perform load testing. The following figures describe two such examples. In the first example, it is more important for load testing to be completed in a timely manner at the expense of geographic coverage (e.g., the load testing customer does not want to wait). In the second example, geographic coverage is more important (e.g., the load testing customer is willing to wait) and load testing is not performed until some minimum or threshold amount of geographic distribution is achieved.

Figure 7:
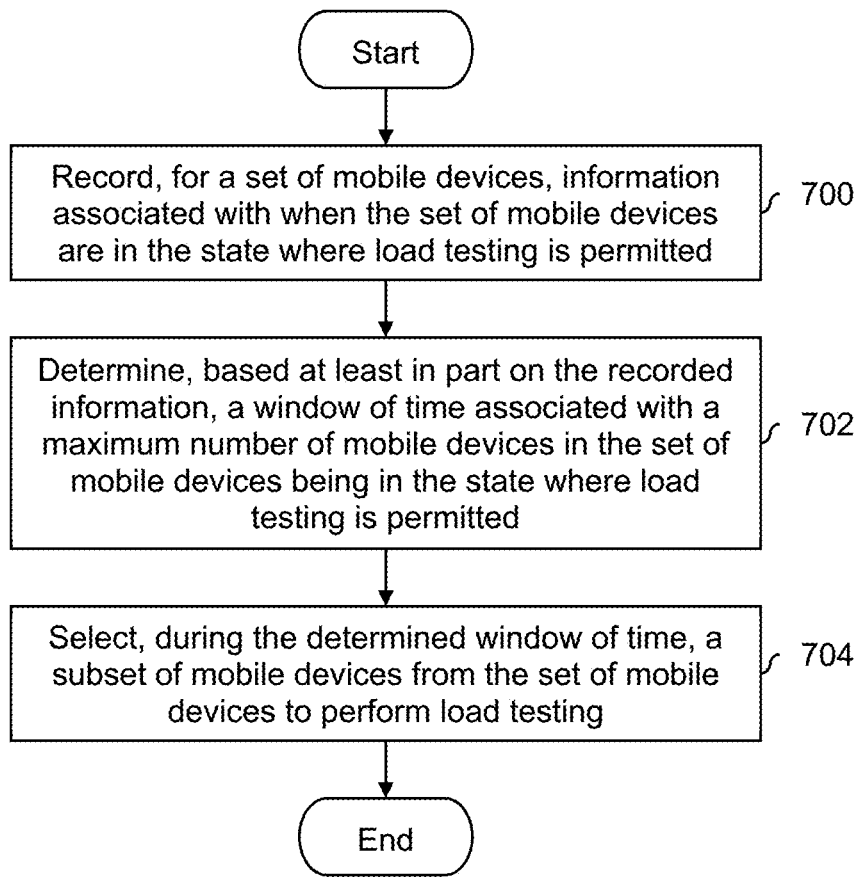
FIG. 7 is a flowchart illustrating an embodiment of a process to select a geographically distributed group of mobile devices to perform load testing using historic information.

FIG. 7 is a flowchart illustrating an embodiment of a process to select a geographically distributed group of mobile devices to perform load testing using historic information. As described above, this process may be used when the load testing customer prefers the load testing to be completed in a timely manner and is unwilling to wait for an indefinite period of time (e.g., until some coverage threshold is satisfied).

At 700, information associated with when the set of mobile devices are in the state where load testing is permitted is recorded for a set of mobile devices. For example, the set of mobile devices may be all mobile devices which are eligible to participate in load testing (e.g., they have passed some verification process and have successfully registered with the load testing service). The recorded information may be recorded by the load testing app on each mobile device and uploaded to the load testing server. The recorded information may include, the days of the week and the times when that particular mobile device was in the state where load testing is permitted.

At 702, a window of time associated with a maximum number of mobile devices in the set of mobile devices being in the state where load testing is permitted is determined based at least in part on the recorded information. For example, the recorded information from all of the mobile devices in the load testing system is aggregated and evaluated at the load testing server and it is determined when peak numbers of mobile devices are in the state where load testing is permitted (e.g., between 1 am and 5 am on weekdays).

At 704, during the determined window of time, a subset of mobile devices is selected from the set of mobile devices to perform load testing. In other words, the mobile devices to perform load testing are selected (e.g., with load testing subsequently performed soon thereafter) during a window of time which historically has a peak or maximum number of mobile devices which are in a state where load testing is permitted. This increases the odds of good geographic distribution.

Figure 8:
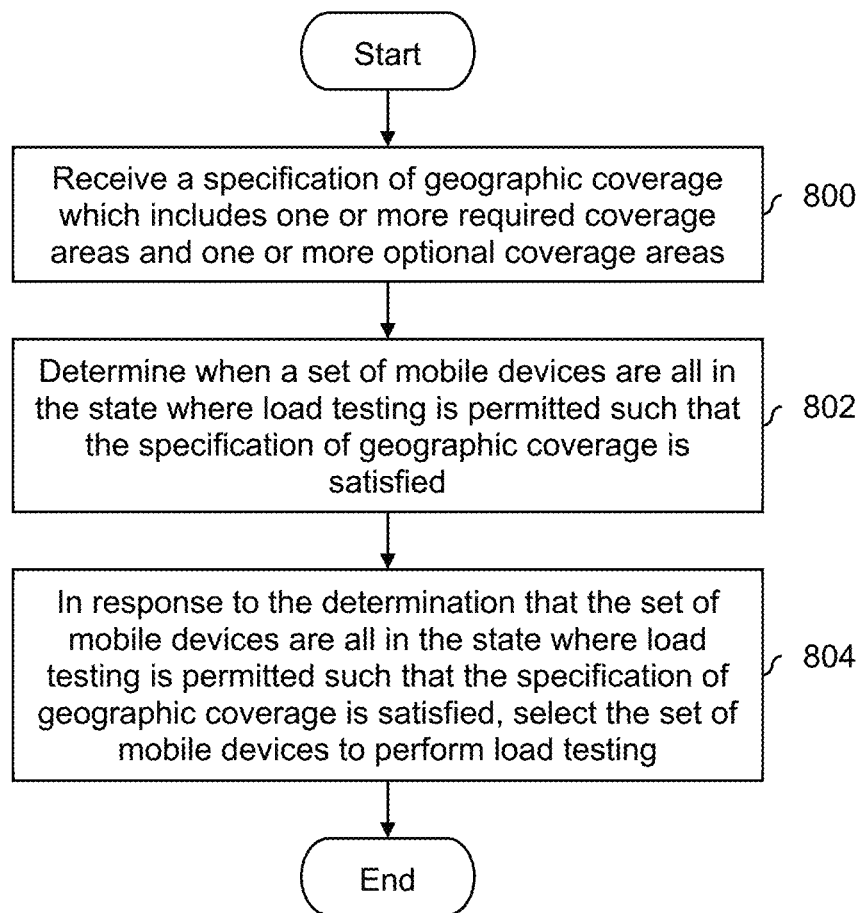
FIG. 8 is a flowchart illustrating an embodiment of a process to select a geographically distributed group of mobile devices to perform load testing using a specification of geographic coverage.

FIG. 8 is a flowchart illustrating an embodiment of a process to select a geographically distributed group of mobile devices to perform load testing using a specification of geographic coverage. In this example, the load testing customer is willing to wait (e.g., indefinitely) until the specification of geographic coverage is satisfied.

At 800, a specification of geographic coverage which includes one or more required coverage areas and one or more optional coverage areas is received. For example, the required coverage areas are areas where the load testing customer must have testing mobile device(s) in and the optional coverage areas are areas where the load testing customer would like to have (but does not require) testing mobile device(s). In some embodiments, the coverage areas are specified by metropolitan area.

At 802, it is determined when a set of mobile devices are all in the state where load testing is permitted such that the specification of geographic coverage is satisfied. In one example, the specification of geographic coverage is satisfied when all of the required coverage areas have been satisfied, regardless of how many optional coverage areas are satisfied.

Alternatively, in some embodiments the specification includes a percentage associated with the optional coverage areas and this percentage is used in the determination at step 802. For example, the load testing client may specify that at least 90% of the optional coverage areas must have a testing mobile device.

At 804, in response to the determination that the set of mobile devices are all in the state where load testing is permitted such that the specification of geographic coverage is satisfied, the set of mobile devices is selected to perform load testing. In other words, the group of mobile devices that satisfy the specification of geographic coverage are used to perform load testing.

In some embodiments, the owners of the mobile devices receive compensation for the use of their mobile devices. As result, some fraudulent users try to cheat the system. The following figures give some examples of how to detect such cheaters so that they can be excluded from the load testing system.

Figure 9:
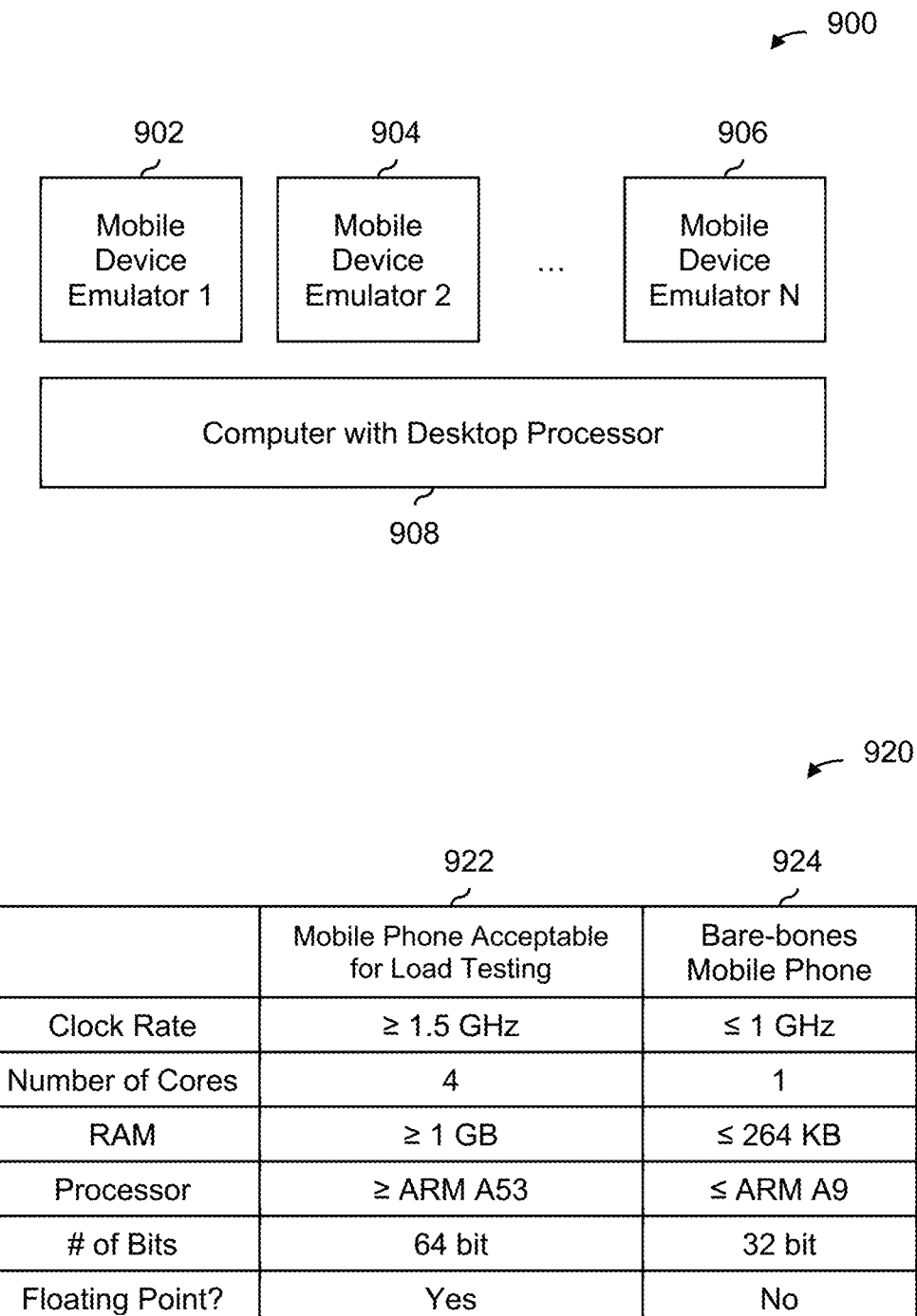
FIG. 9 is a diagram illustrating an embodiment of load testing cheaters, including mobile device emulators and bare-bones mobile phones.

FIG. 9 is a diagram illustrating an embodiment of load testing cheaters, including mobile device emulators and bare-bones mobile phones. In the example shown, diagram 900 shows an example of mobile device emulators (902, 904, and 906) which are running on a single computer (908). For example, the mobile device emulators may be an Android emulator. In this example, the fraudulent person signs up each of mobile device emulators (902, 904, and 906) to participate in load testing and receives compensation for all of those device. The problem is that a fraudulent person may have hundreds of mobile device emulators all running on the same computer, which limits the ability of each individual mobile device emulator to generate the desired load and/or page request frequency since all of the emulators must share the same processing, I/O, and/or storage resources of computer 908. To put it another way, the load testing service may be paying full price but getting cut-rate service or performance in return.

Diagram 920 shows another cheating scenario. In this example, a fraudulent user acquires a cheap, bare-bones mobile device and registers that mobile phone up for load testing. The table shown in diagram 920 compares the specifications of a mobile phone which is acceptable for load testing (column 922) with the specifications of a bare-bones mobile phone which is not acceptable for load testing (column 924). For example, the bare-bones mobile phone may be 5-10 years old or offered for free by mobile phone service providers. As an example of an acceptable phone, the Samsung Galaxy S6-S8 all have acceptable performance to do load testing whereas the Galaxy S1 (as an example) has insufficient performance.

As shown in diagram 920, the clock rate of the acceptable mobile phone is at least 1.5 GHz whereas the clock rate of bare-bones mobile phones max out at 1 GHz. Acceptable mobile phones have processors with 4 cores whereas bare-bones mobile phones have processors with only a single core. Acceptable mobile phones have at least 1 GB of RAM (e.g., memory); bare-bones mobile phones have at most 264 KB of RAM. Acceptable mobile phones have processors that at least an ARM A53 or newer whereas bare-bones mobile phones have processors that are at best an ARM A9. Acceptable mobile phones have 64 bit processing whereas bare-bones mobile phones have 32 bit processing. And with regard to floating point capabilities, the acceptable mobile phone have it and bare-bones mobile phones do not.

The following figures illustrate some example techniques to detect when these and other scenarios occur so that such devices can be excluded from participating in load testing (e.g., they are not allowed to register or they are de-registered if they were previously permitted to register).

Figure 10:
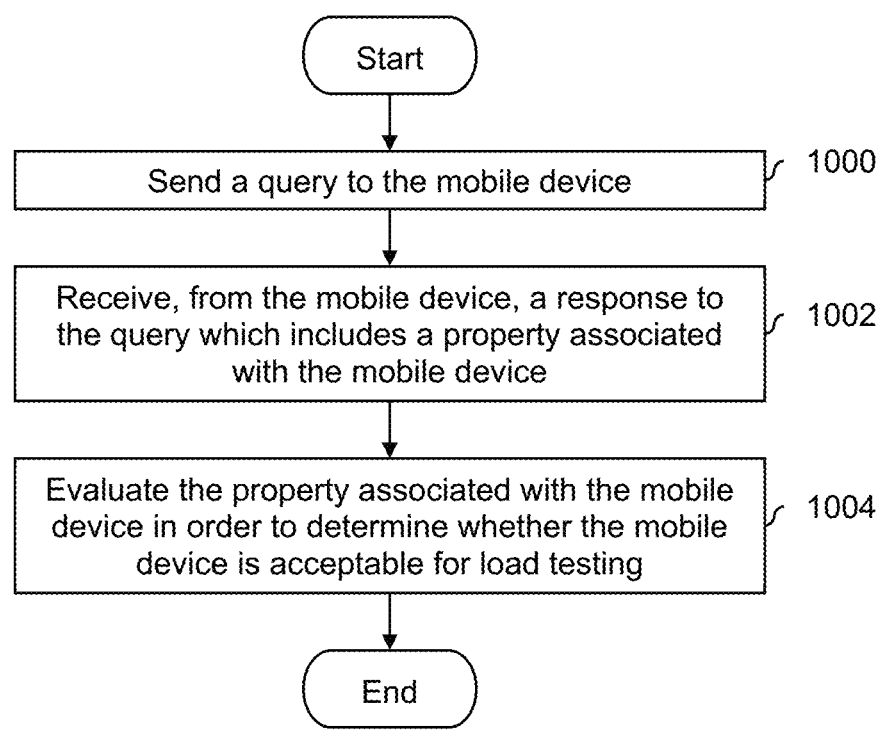
FIG. 10 is a flowchart illustrating an embodiment of a verification process which includes querying the mobile device in order to obtain a property which is evaluated.

FIG. 10 is a flowchart illustrating an embodiment of a verification process which includes querying the mobile device in order to obtain a property which is evaluated. In some embodiments, this verification process is performed during a sign up and/or initialization process. In some embodiments, the verification process of FIG. 10 is performed in combination with the load testing process of FIG. 1. For example, only mobile device which are confirmed to be sufficient for load testing are permitted to participate in load testing. In some embodiments, the process is performed at least in part by a load testing app running on a mobile device. This may be desirable because it offloads at least this part of the verification process to the load testing app, freeing up the load testing server.

At 1000, a query is sent to the mobile device. For example, the process of FIG. 10 may be performed by a load testing app which is downloaded to and runs on a mobile device being verified. Once downloaded to a mobile device, the load testing app may output the query.

At 1002, a response to the query which includes a property associated with the mobile device is received from the mobile device. For example, the properties shown in diagram 720 illustrate some properties which may be returned in response to the query.

At 1004, the property associated with the mobile device is evaluated in order to determine whether the mobile device is acceptable for load testing. For example, in diagram 900 in FIG. 9, the computer (908) on which the emulators run is typically use a desktop type of processor (e.g., designed for PCs or servers) whereas most mobile devices use mobile processors. In some embodiments, the property relates to whether the device's processor is a mobile processor (e.g., an ARM processor) or a desktop processor (e.g., an x86 processor). If a desktop type of processor is detected (e.g., because the processor is an ARM processor), then this is a strong indicator of a mobile device emulator and that mobile device would not be acceptable for load testing.

In some embodiments, there are legitimate mobile devices which would be acceptable for load testing which do, in fact, use desktop processors. For example, Lenovo makes some tablets with x86 processors which would be acceptable for load testing. In some embodiments, there is a second check if a desktop processor is detected to check for known mobile devices with desktop processors which are acceptable by obtaining some device or brand identifier and comparing it against a whitelist.

Returning to FIG. 9, as shown there, the returned property may be compared to some threshold to determine if the mobile device is acceptable at step 1004. For example, if the clock rate or number of cores is below some threshold then the mobile device is not acceptable. In some embodiments, multiple properties are checked and a single failure is sufficient to exclude the mobile device from load testing.

In some embodiments, a blacklist (or, alternatively, whitelist) of devices is maintained. In some embodiments, the property includes a device identifier (e.g., the manufacturer and model name) and that device identifier is compared against the blacklist (or, alternatively, whitelist) of devices. For example, this might be useful in filtering out bare-bones mobile phones such that in column 924 in FIG. 9.

Alternatively, in some embodiments, a verification process has the mobile device perform some operation or other piece of code. The following figure shows an example of this.

Figure 11:
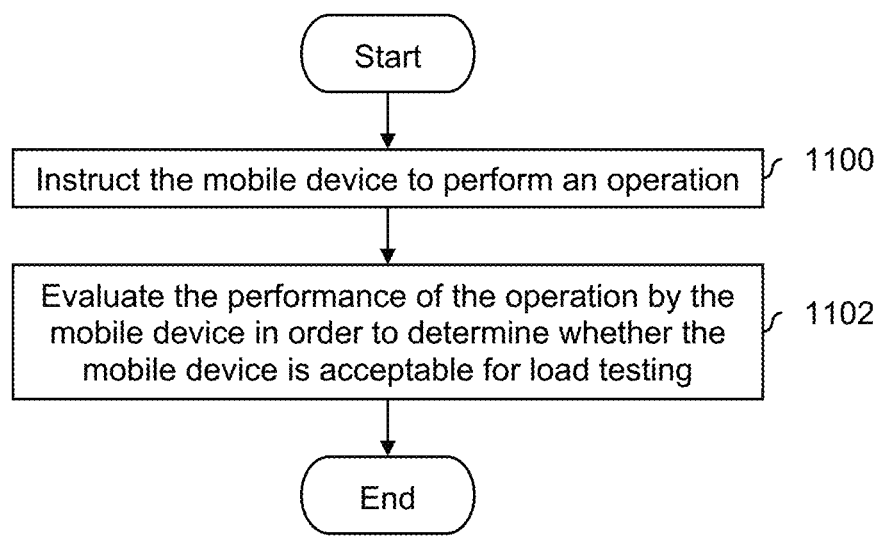
FIG. 11 is a flowchart illustrating an embodiment of a verification process which includes having the mobile device perform an operation.

FIG. 11 is a flowchart illustrating an embodiment of a verification process which includes having the mobile device perform an operation. FIG. 11 is similar to FIG. 10 and may be performed at similar times, in combination with the same processes, and/or by the same entities as described above with regard to FIG. 10.

At 1100, the mobile device is instructed to perform an operation. For example, after being downloaded to the mobile device, a load testing app (e.g., during some initialization or sign up process) instructs the underlying mobile device to perform an operation. As will be described in more detail below, the operation may be to determine whether the processor is a desktop processor (e.g., and thus the mobile device has a high probability of being a mobile device emulator, which is unacceptable for load testing) or a mobile processor (e.g., which is acceptable for load testing). Alternatively, in some embodiments, the operation includes a load test (e.g., a previous or historic load test).

At 1102, the performance of the operation by the mobile device is evaluated in order to determine whether the mobile device is acceptable for load testing. For example, some desktop processors have some capabilities or features which mobile processors do not have or otherwise do not support and the operation may be directed to exposing this differentiating capabilities or feature. In diagram 900 in FIG. 9, such an operation would expose computer 908 as having a desktop processor, which would eliminate mobile device emulators 902, 904, and 906 from the load test. Or, in diagram 920 in FIG. 9, the operation would only work for 64 bit processors but not 32 bit processors.

In some embodiments, the operation includes a load test. The mobile device may (for example) be instructed by the load testing app to send page requests to some web server for a certain amount of time. The load testing app may then evaluate whether the performed load testing satisfied some performance threshold. For example, the mobile device should have been able to send at least n page requests to the web server in the specified amount of time. Alternatively, some other performance metric may be evaluated. Looking at FIG. 9, both the mobile device emulators (902, 904, and 906) and the bare-bones mobile phone (924) would fail the load test because they would not be able to send an acceptable or minimum number of page requests or otherwise generate a desired load level.

In some cases, there may be a bottleneck somewhere between a mobile and the web server that is independent of the quality of the mobile device(s). The following figures illustrate such an example bottleneck and a technique to detect it.

Figure 12:
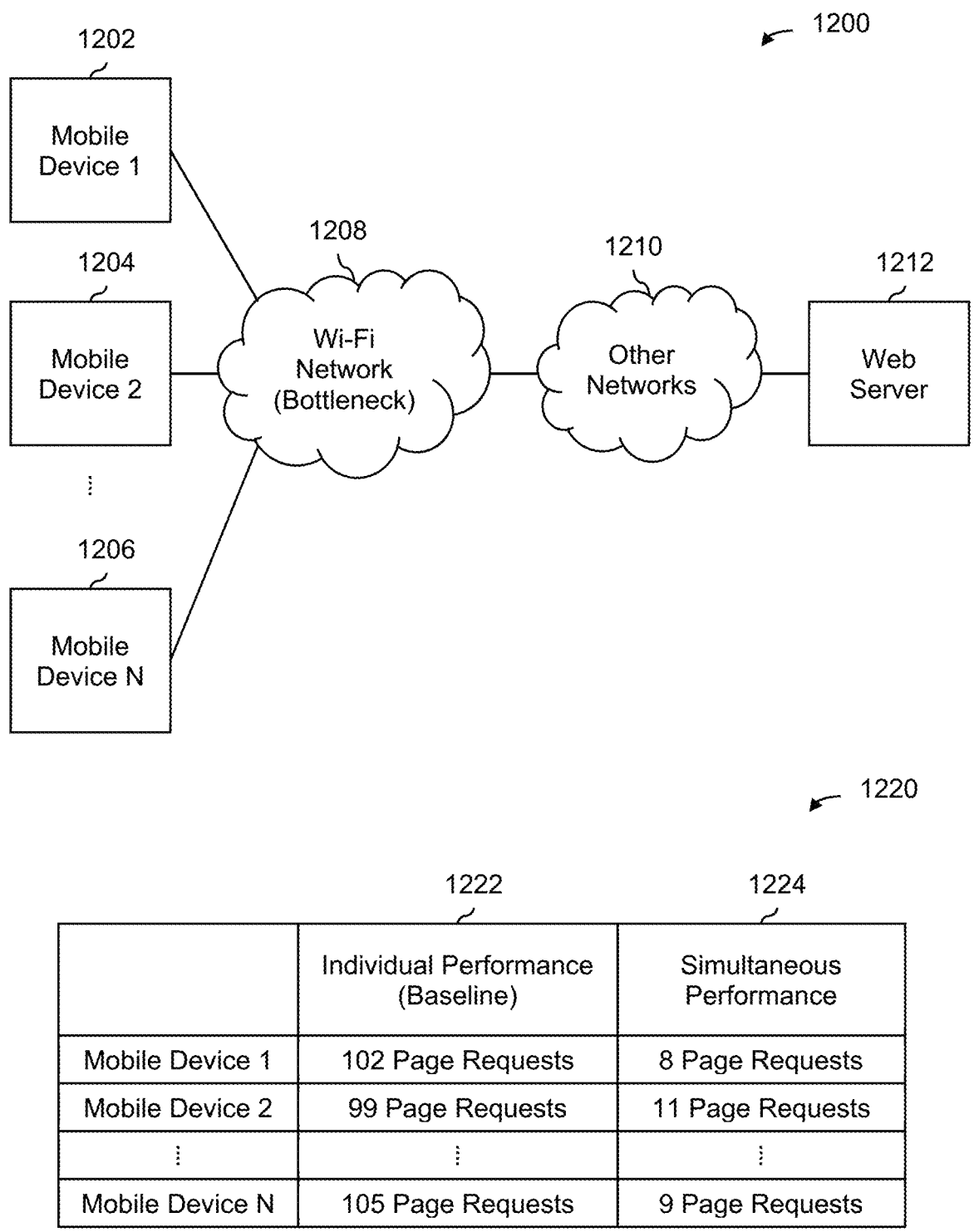
FIG. 12 is a diagram illustrating an embodiment of a wireless network bottleneck.

FIG. 12 is a diagram illustrating an embodiment of a wireless network bottleneck. Diagram 1200 shows an example where a user signs up mobile devices 1202, 1204, and 1206 to perform load testing. In this example, all of the wireless devices (1202, 1204, and 1206) individually have sufficient resources and/or ability to perform load testing. For example, they may be all relatively new, relatively high-end mobile phones or tablets (e.g., a flagship mobile device within the last 2 or 3 generations or revisions). The problem is that if all of the mobile devices participated in load testing at the same time (and thus needed to simultaneously communicate with web server 1212 via Wi-Fi network 1208 and other networks 1210), there would be a bottleneck at Wi-Fi network 1208.

Diagram 1220 illustrates a technique to detect such a bottleneck. In this example, each of the mobile devices is instructed to individually (e.g., with the other wireless devices relatively idle and/or not performing load testing) perform a load test. This establishes a baseline for each mobile device which is shown in column 1222. Then, all of the mobile devices are instructed to simultaneously perform load testing and the performance results for each mobile device is shown in column 1224. As shown here, the performance drops significantly (e.g., from ~100 page requests to ~10 page requests) between the individual performance and the simultaneous performance. This indicates a bottleneck like the one shown in diagram 1200.

The following describes this example more generally and/or formally in a flowchart.

Figure 13:
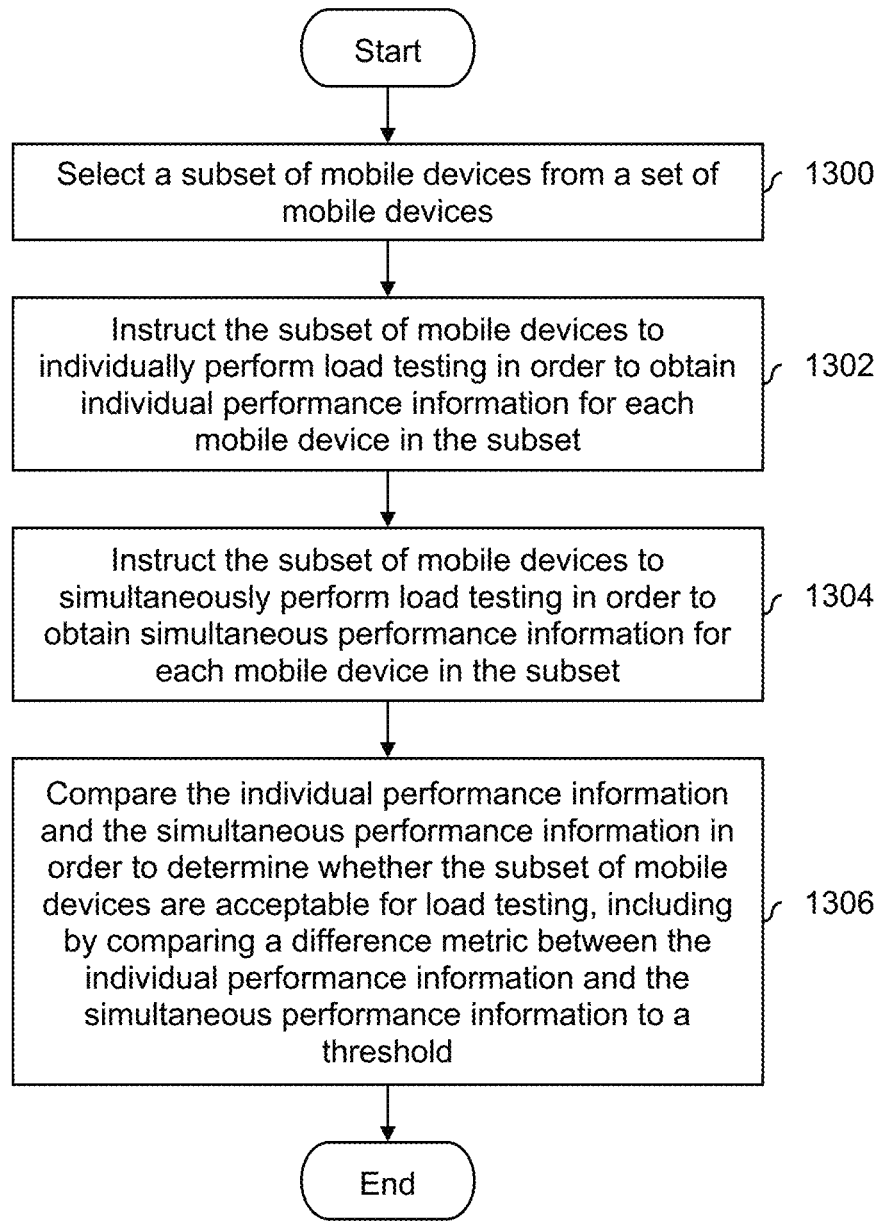
FIG. 13 is a flowchart illustrating an embodiment of a verification process which includes a bottleneck check.

FIG. 13 is a flowchart illustrating an embodiment of a verification process which includes a bottleneck check. This verification process may be performed in combination with any of the processes described above (e.g., prior to FIG. 1 and/or with other verification processes, such as FIG. 10 and FIG. 11). In some embodiments, since this test is more resource-intensive (e.g., compared to FIG. 10 and FIG. 11), this process is performed only after less resource-intensive verification processes (e.g., FIG. 10 and/or FIG. 11) have been performed. For example, it would be undesirable to perform this resource-intensive process and then have the mobile devices be excluded anyway due to the verification process of FIG. 10 and/or FIG. 11. In some embodiments, the process is performed by a load testing server.

At 1300, a subset of mobile devices is selected from a set of mobile devices. For example, the set of mobile device may include all of the already-verified or already-registered mobile devices, as well as mobile device which are in the process of being verified and/or registered. The subset of mobile devices is the group of device which the bottleneck checking process will be performed on. For example, in FIG. 12, the subset of mobile devices would include mobile devices 1202, 1204, and 1206. Some examples for how to select mobile devices to perform bottleneck checking on are described below.

At 1302, the subset of mobile devices are instructed to individually perform load testing in order to obtain individual performance information for each mobile device in the subset. For example, in FIG. 12, mobile device 1202 would perform load testing on web server 1212 while the other mobile devices (1204 and 1206) refrain from load testing. Then, mobile device 1202 performs load testing on web server 1212 by itself, and so on. Column 1222 shows an example of individual performance information (e.g., which establishes a performance baseline). In that example, the individual performance information includes the number of page requests the mobile device was able to send out.

At 1304, the subset of mobile devices are instructed to simultaneously perform load testing in order to obtain simultaneous performance information for each mobile device in the subset. For example, in FIG. 12, all of mobile devices 1202, 1204, and 1206 would load test web server 1212 at the same time. Each mobile device records performance information for that mobile device while all mobile devices are simultaneously performing load testing; column 1224 shows an example of simultaneous performance information.

At 1306, the individual performance information and the simultaneous performance information are compared in order to determine whether the subset of mobile devices are acceptable for load testing, including by comparing a difference metric between the individual performance information and the simultaneous performance information to a threshold. In one example, there are a plurality of difference metrics, one for each mobile device in the subset being verified. In one example, in FIG. 12, the first difference metric is a difference of 102−8=94 page requests, the second difference metric is a difference of 99−11=88 page requests, and so on. These difference metrics are then compared against a threshold. For example, suppose the individual performance and simultaneous performance (e.g., for a given mobile device) are expected to be within a 5 page request difference.

Depending upon the scarcity and/or need for verified mobile devices, the verification process may be configured to take an aggressive or relaxed approach if some, but not all of the difference metrics fail the comparison with the threshold. In a relaxed approach (e.g., if verified mobile devices are scare and more are desired), then only those mobile devices which failed the threshold comparison do not pass verification and are not permitted to register with the load testing service. In a more aggressive approach (e.g., if verified mobile devices are more abundant), all (or all except one) of the mobile devices fail verification and are not permitted to register with the load testing service. In some embodiments, a single mobile device from the group is permitted to pass verification and register with the load testing service since a single mobile device performing load testing will not cause a bottleneck. For example, in diagram 1200 in FIG. 12, a bottleneck would not occur if only mobile device 1202 were permitted to perform load testing on web server 1212 and mobile device 1204 and 1206 were excluded from load testing.

Alternatively, there may be a single difference metric. For example, an average individual performance and average simultaneous performance may be determined, respectively, from all of the individual performance information and all of the simultaneous performance information. The two averages may then be subtracted and the difference is compared to the threshold. As before, there should be little or no performance drop; a drop which exceeds the threshold is indicative of a bottleneck in the system.

Although a wireless network bottleneck is shown in FIG. 12 and used to illustrate the process of FIG. 13, the process of FIG. 13 may be used to detect other types of bottlenecks (e.g., any other limited resource, such as I/Os, ports, processing, memory, etc.).

The following figures illustrate some examples of how groups of mobile devices on which bottleneck checking is performed are selected (see, e.g., step 1300).

Figure 14:
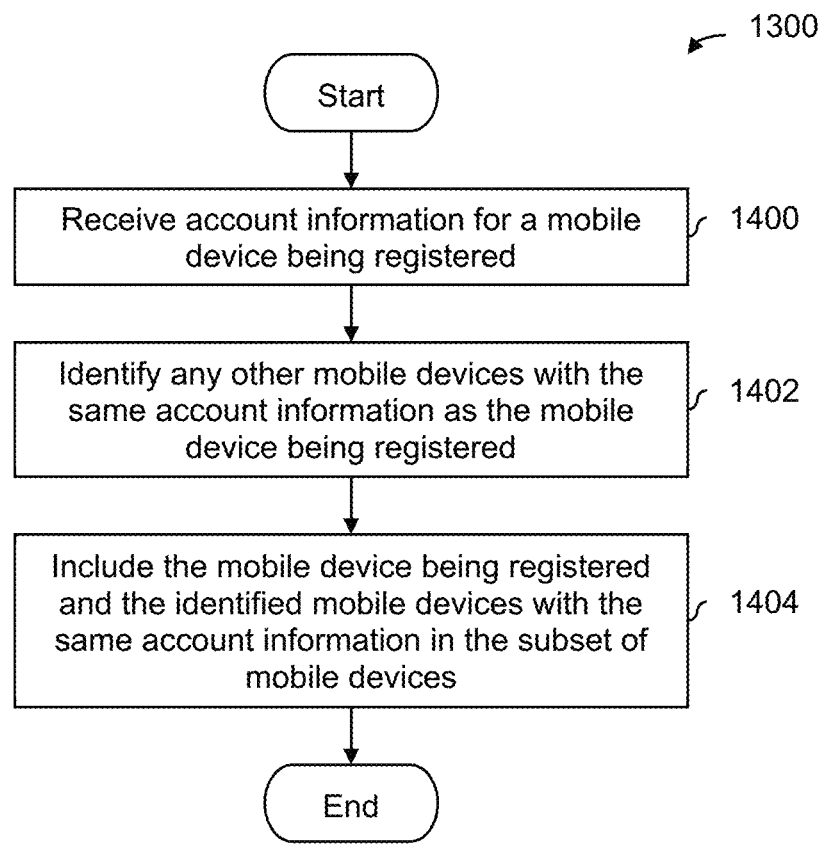

FIG. 14 is a flowchart illustrating an embodiment of a process to use account information to select a subset of mobile devices to perform bottleneck checking on. In some embodiments, the process is used at step 1300 in FIG. 13.

At 1400, account information for a mobile device being registered is received. For example, the process of FIG. 14 may be performed on new mobile devices which are being registered to participate in load testing. Each new mobile device being registered is associated with a particular account where each account is uniquely identified by a username. In one example, the username associated with a mobile device being registered is received.

At 1402, any other mobile devices with the same account information as the mobile device being registered are identified. For example, if the username received at step 1400 is janedoe, then other mobile devices which are already registered to and/or under the janedoe user name are identified.

In some embodiments, users are compensated for the use of their mobile devices and account information includes bank or other information about where payments are to be directed (e.g., the user's Paypal, Venmo, etc. information). In some embodiments, the account information received and used at steps 1400 and 1402, respectively, includes financial information. For example, in the case of bank information, the account information may include a routing number and bank account. In the case of online payment system or service (e.g., Paypal, Venmo, etc.), the account information may include the name of online payment system or service and a username or other account identifier.

At 1404, the mobile device being registered and the identified mobile devices with the same account information are included in the subset of mobile devices. In FIG. 12, for example, mobile device 1202, 1204, and 1206 are all registered using the same account information which would trigger bottleneck checking. Mobile device 1202 (e.g., for which information is received at 1400) may be in the process of being registered; mobile devices 1204 and 1206 (e.g., identified at 1402) may also be in the process of registering or alternatively may already be registered.

In some embodiments, the account information used in this process includes redemption account information (e.g., a Google Wallet account, a PayPal account). For example, a single user with many devices may redeem their earnings (e.g., from the various devices) to a common PayPal account. In some embodiments, the account information used in this process includes a wireless network that the devices are connected to. For example, a single user with many device will usually connect all of those devices to the same WiFi network when registering those devices.

Figure 15:
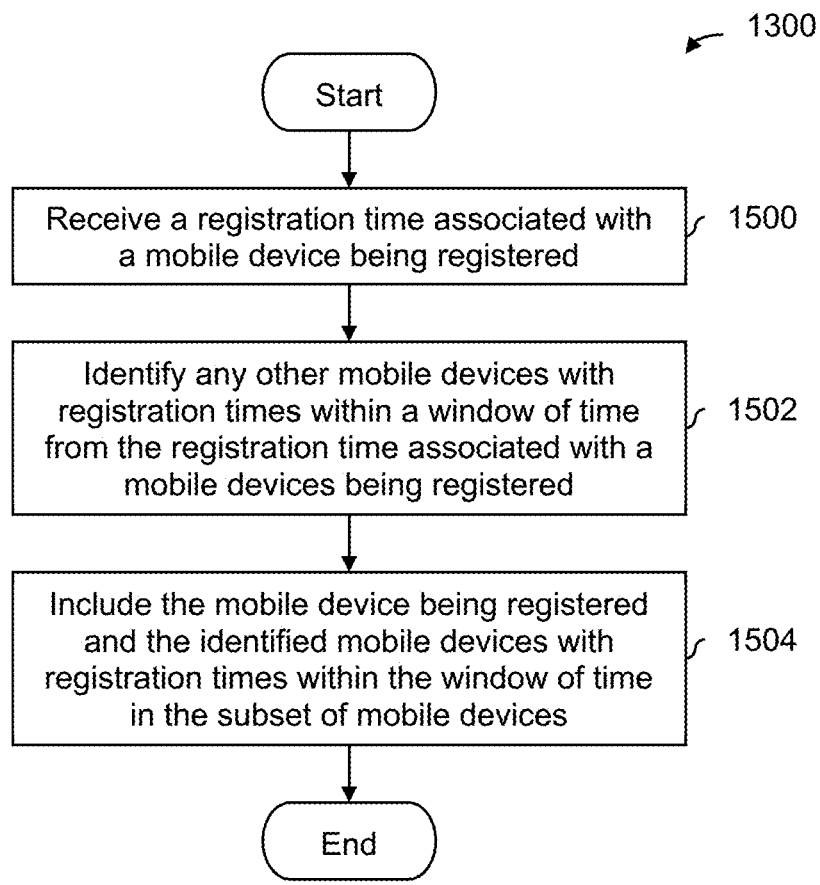

FIG. 15 is a flowchart illustrating an embodiment of a process to use registration times to select a subset of mobile devices to perform bottleneck checking on. In some embodiments, the process is used at step 1300 in FIG. 13.

At 1500, a registration time associated with a mobile device being registered is received. Depending upon the particular registration implementation, the registration may be defined in a variety of ways. In one example, a load testing app is downloaded to each mobile device and via the load testing app, that mobile device is associated with and/or registered under a particular account and/or username. In some embodiments, the registration time is the time when that association is made via the load testing app.

At 1502, any other mobile devices with registration times within a window of time from the registration time associated with a mobile devices being registered are identified. In various embodiments, the window of time may be strictly before the registration time received at step 1500, a window of time around the registration time received at step 1500, or strictly after the registration time received at step 1500. For example, some fraudulent users tend to register a batch of fraudulent devices at the same time. Identifying groups based on registration time helps to identify fraudulent devices that are added in a single batch. In some embodiments, all new devices being registered on a particular day or within a particular period of time are grouped together for bottleneck checking.

At 1504, the mobile device being registered and the identified mobile devices with registration times within the window of time are included in the subset of mobile devices. In FIG. 12, for example, mobile device 1202, 1204, and 1206 are all registered around the same time which would trigger bottleneck checking.

Figure 16:
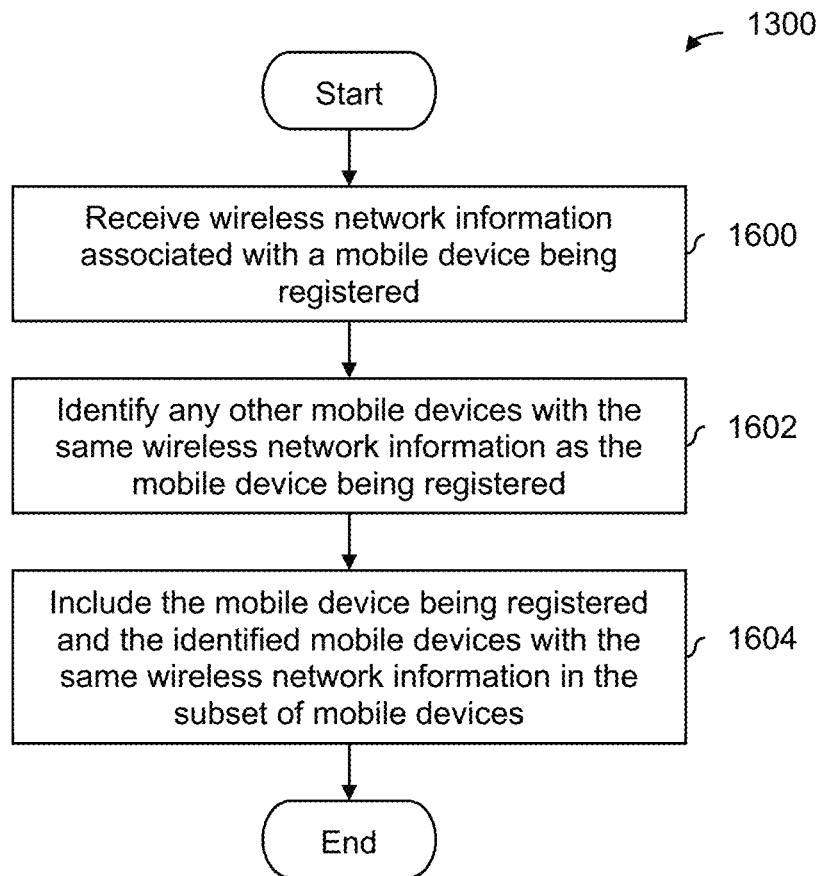

FIG. 16 is a flowchart illustrating an embodiment of a process to use wireless network information to select a subset of mobile devices to perform bottleneck checking on. In some embodiments, the process is used at step 1300 in FIG. 13.

At 1600, wireless network information associated with a mobile device being registered is received. For example, a load testing app may obtain the name of the Wi-Fi network that a mobile device is on using the mobile operation system and/or some wireless network utility or tool. In FIG. 12, for example, the name of Wi-Fi network 1208 would be obtained.

At 1602, any other mobile devices with the same wireless network information as the mobile device being registered are identified. For example, in FIG. 12, if mobile device 1 (1202) were the mobile device processed at step 1202, then mobile device 2 (1204) and mobile device N (1206) would be identified at step 104 since they would have the same wireless network information (e.g., are associated with a Wi-Fi network of the same name).

At 1604, the mobile device being registered and the identified mobile devices with the same wireless network information are included in the subset of mobile devices. In FIG. 12, for example, mobile device 1202, 1204, and 1206 are all on the same wireless network which would trigger bottleneck checking.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for load testing, comprising:
a processor; and
a memory coupled with the processor, wherein the memory is configured to provide the processor with instructions which when executed cause the processor to:
   determine whether a mobile device is acceptable for load testing, including by:
      determining whether the mobile device is a mobile device emulator that is not a physical mobile device; and
      in response to a determination that the mobile device is the mobile device emulator that is not a physical mobile device, concluding that the mobile device is not acceptable for load testing;
   in response to a determination that the mobile device is acceptable for load testing, send an instruction to perform load testing to the mobile device, wherein:
      an application running on the mobile device determines that the mobile device is in a state where load testing is permitted; and
      in response to receiving the instruction, the application running on the mobile device performs load testing on a web server if the mobile device is in the state where load testing is permitted;
   receive, from the application running on the mobile device, performance information associated with the load testing; and
   display the performance information associated with the load testing.

2. The system recited in claim 1, wherein the mobile device includes one or more of the following: a mobile telephone or a tablet.

3. The system recited in claim 1, wherein the application running on the mobile device determines that the mobile device is in the state where load testing is permitted, including by:
   determining that the mobile device is connected to a Wi-Fi network;
   determining that the mobile device is connected to a charger; and
   in response to the determination that the mobile device is connected to a Wi-Fi network and the mobile device is connected to a charger, determining that the mobile device is in a state where the mobile device is permitted to perform load testing.

4. The system recited in claim 1, wherein:
receiving further includes receiving geographic information associated with the mobile device; and
displaying further includes displaying a first set of performance information received from a first set of one or more mobile devices located in a first geographic area and a second set of performance information received from a second set of one or more mobile devices located in a second geographic area.

5. The system recited in claim 1, wherein the memory is further configured to provide the processor with instructions which when executed cause the processor to:
   record, for a set of mobile devices, information associated with when the set of mobile devices are in the state where load testing is permitted;
   determine, based at least in part on the recorded information, a window of time associated with a maximum number of mobile devices in the set of mobile devices being in the state where load testing is permitted; and
   select, during the determined window of time, a subset of mobile devices from the set of mobile devices to perform load testing.

6. The system recited in claim 1, wherein the memory is further configured to provide the processor with instructions which when executed cause the processor to:
   receive a specification of geographic coverage which includes one or more required coverage areas and one or more optional coverage areas;
   determine when a set of mobile devices are all in the state where load testing is permitted such that the specification of geographic coverage is satisfied; and
   in response to the determination that the set of mobile devices are all in the state where load testing is permitted such that the specification of geographic coverage is satisfied, select the set of mobile devices to perform load testing.

7. The system recited in claim 1, wherein the memory is further configured to provide the processor with instructions which when executed cause the processor to:
   send a query to the mobile device;
   receive, from the mobile device, a response to the query which includes a property associated with the mobile device; and
   evaluate the property associated with the mobile device in order to determine that the mobile device is acceptable for load testing.

8. The system recited in claim 1, wherein the memory is further configured to provide the processor with instructions which when executed cause the processor to:
   instruct the mobile device to perform an operation; and
   evaluate the performance of the operation by the mobile device in order to determine that the mobile device is acceptable for load testing.

9. The system recited in claim 1, wherein the memory is further configured to provide the processor with instructions which when executed cause the processor to:
   select a subset of mobile devices from a set of mobile devices;
   instruct the subset of mobile devices to individually perform load testing in order to obtain individual performance information for each mobile device in the subset;
   instruct the subset of mobile devices to simultaneously perform load testing in order to obtain simultaneous performance information for each mobile device in the subset; and
   compare the individual performance information and the simultaneous performance information in order to determine that the subset of mobile devices are acceptable for load testing, including by comparing a difference metric between the individual performance information and the simultaneous performance information to a threshold.

10. The system recited in claim 1, wherein the memory is further configured to provide the processor with instructions which when executed cause the processor to:
   select a subset of mobile devices from a set of mobile devices, including by:
      receiving account information for a mobile device being registered;

identifying any other mobile devices with the same account information as the mobile device being registered; and including the mobile device being registered and the identified mobile devices with the same account information in the subset of mobile devices;

instruct the subset of mobile devices to individually perform load testing in order to obtain individual performance information for each mobile device in the subset;

instruct the subset of mobile devices to simultaneously perform load testing in order to obtain simultaneous performance information for each mobile device in the subset; and compare the individual performance information and the simultaneous performance information in order to determine that the subset of mobile devices are acceptable for load testing, including by comparing a difference metric between the individual performance information and the simultaneous performance information to a threshold.

11. The system recited in claim 1, wherein the memory is further configured to provide the processor with instructions which when executed cause the processor to:

select a subset of mobile devices from a set of mobile devices, including by:

receiving a registration time associated with a mobile device being registered;

identifying any other mobile devices with registration times within a window of time from the registration time associated with a mobile device being registered; and including the mobile device being registered and the identified mobile devices with registration times within the window of time in the subset of mobile devices;

instruct the subset of mobile devices to individually perform load testing in order to obtain individual performance information for each mobile device in the subset;

instruct the subset of mobile devices to simultaneously perform load testing in order to obtain simultaneous performance information for each mobile device in the subset; and compare the individual performance information and the simultaneous performance information in order to determine that the subset of mobile devices are acceptable for load testing, including by comparing a difference metric between the individual performance information and the simultaneous performance information to a threshold.

12. The system recited in claim 1, wherein the memory is further configured to provide the processor with instructions which when executed cause the processor to:

select a subset of mobile devices from a set of mobile devices, including by:

receiving wireless network information associated with a mobile device being registered;

identifying any other mobile devices with the same wireless network information as the mobile device being registered; and including the mobile device being registered and the identified mobile devices with the same wireless network information in the subset of mobile devices;

instruct the subset of mobile devices to individually perform load testing in order to obtain individual performance information for each mobile device in the subset;

instruct the subset of mobile devices to simultaneously perform load testing in order to obtain simultaneous performance information for each mobile device in the subset; and compare the individual performance information and the simultaneous performance information in order to determine that the subset of mobile devices are acceptable for load testing, including by comparing a difference metric between the individual performance information and the simultaneous performance information to a threshold.

13. A method for load testing, comprising:

determining whether a mobile device is acceptable for load testing, including by:

determining whether the mobile device is a mobile device emulator that is not a physical mobile device; and in response to a determination that the mobile device is the mobile device emulator that is not a physical mobile device, concluding that the mobile device is not acceptable for load testing;

in response to a determination that the mobile device is acceptable for load testing, sending an instruction to perform load testing to the mobile device, wherein:

an application running on the mobile device determines that the mobile device is in a state where load testing is permitted; and in response to receiving the instruction, the application running on the mobile device performs load testing on a web server if the mobile device is in the state where load testing is permitted;

receiving, from the application running on the mobile device, performance information associated with the load testing; and displaying the performance information associated with the load testing.

14. The method recited in claim 13, wherein the mobile device includes one or more of the following: a mobile telephone or a tablet.

15. The method recited in claim 13, wherein the application running on the mobile device determines that the mobile device is in the state where load testing is permitted, including by:

determining that the mobile device is connected to a Wi-Fi network;

determining that the mobile device is connected to a charger; and in response to the determination that the mobile device is connected to a Wi-Fi network and the mobile device is connected to a charger, determining that the mobile device is in a state where the mobile device is permitted to perform load testing.

16. The method recited in claim 13, wherein:

receiving further includes receiving geographic information associated with the mobile device; and displaying further includes displaying a first set of performance information received from a first set of one or more mobile devices located in a first geographic area and a second set of performance information received from a second set of one or more mobile devices located in a second geographic area.

17. A computer program product embodied in a non-transitory computer readable storage medium and comprising computer instructions for:
  determining whether a mobile device is acceptable for load testing, including by:
    determining whether the mobile device is a mobile device emulator that is not a physical mobile device; and
    in response to a determination that the mobile device is the mobile device emulator that is not a physical mobile device, concluding that the mobile device is not acceptable for load testing;
  in response to a determination that a mobile device is acceptable for load testing, sending an instruction to perform load testing to the mobile device, wherein:
    an application running on the mobile device determines that the mobile device is in a state where load testing is permitted; and
    in response to receiving the instruction, the application running on the mobile device performs load testing on a web server if the mobile device is in the state where load testing is permitted;
  receiving, from the application running on the mobile device, performance information associated with the load testing; and
  displaying the performance information associated with the load testing.

18. The computer program product recited in claim 17, wherein the mobile device includes one or more of the following: a mobile telephone or a tablet.

19. The computer program product recited in claim 17, wherein the application running on the mobile device determines that the mobile device is in the state where load testing is permitted, including by:
  determining that the mobile device is connected to a Wi-Fi network;
  determining that the mobile device is connected to a charger; and
  in response to the determination that the mobile device is connected to a Wi-Fi network and the mobile device is connected to a charger, determining that the mobile device is in a state where the mobile device is permitted to perform load testing.

20. The computer program product recited in claim 17, wherein:
  receiving further includes receiving geographic information associated with the mobile device; and
  displaying further includes displaying a first set of performance information received from a first set of one or more mobile devices located in a first geographic area and a second set of performance information received from a second set of one or more mobile devices located in a second geographic area.

* * * * *